United States Patent [19]

Tanaka et al.

[11] Patent Number: 5,339,429
[45] Date of Patent: Aug. 16, 1994

[54] PARALLEL PROCESSING SYSTEM AND COMPILING METHOD USED THEREFOR

[75] Inventors: Teruo Tanaka, Hachioji; Yasuhiro Inagami; Yoshiko Tamaki, both of Kodaira; Tadayuki Sakakibara, Kunitachi; Katsuyoshi Kitai, Hadano, all of Japan

[73] Assignee: Hitachi, Ltd., Tokyo, Japan

[21] Appl. No.: 880,544

[22] Filed: May 8, 1992

[30] Foreign Application Priority Data

May 8, 1991 [JP] Japan .................. 3-102480

[51] Int. Cl.⁵ .................. G06F 9/44; G06F 12/12
[52] U.S. Cl. .................. 395/700; 395/700; 364/DIG. 1; 364/280; 364/280.4; 364/245; 364/245.31
[58] Field of Search .............. 395/200, 700, 650, 375, 395/425

[56] References Cited

U.S. PATENT DOCUMENTS

| | | | |
|---|---|---|---|
| 4,823,257 | 4/1989 | Tonomura | 395/700 |
| 4,847,755 | 7/1989 | Morrison et al. | 395/800 |
| 5,056,000 | 10/1991 | Chang | 395/375 |
| 5,201,040 | 4/1993 | Wada et al. | 395/400 |
| 5,212,777 | 5/1993 | Gove et al. | 395/375 |

FOREIGN PATENT DOCUMENTS

| | | | |
|---|---|---|---|
| 5518720 | 2/1980 | Japan | G06F 15/16 |
| 63-305451 | 6/1987 | Japan | G06F 15/16 |
| 63-204361 | 9/1987 | Japan | G06F 15/16 |
| 63-316251 | 12/1988 | Japan | G06F 15/16 |
| 178361 | 3/1989 | Japan | G06F 15/16 |
| 099141 | 4/1989 | Japan | G06F 12/00 |
| 277867 | 3/1990 | Japan | G06F 15/16 |

OTHER PUBLICATIONS

Horikoshi et al., "Japanese Supercomputers . . . Overview & Perspective . . . , Proc. of IEEE International Conf. on Computer Design", pp. 84, 227–231, Oct. 1984.

Primary Examiner—Kevin A. Kriess
Attorney, Agent, or Firm—Antonelli, Terry, Stout & Kraus

[57] ABSTRACT

A parallel processing system includes tightly coupled multiprocessors. Each multiprocessor incorporates a local extended storage device which is a secondary storage device for a main storage device. The tightly coupled multiprocessors are connected with each other through a shared extended storage device. A compiler or preprocessor for the system analyzes the data to be allocated on the extended storage devices to that large scaled data accessed from each tightly-coupled multiprocessor are allocated on the local extended storage whereas the data to be accessed from a plurality of tightly-coupled multiprocessors are allocated on the shared extended storage.

9 Claims, 12 Drawing Sheets

100: MAIN TASK PROGRAM
110: SUB TASK PROGRAM

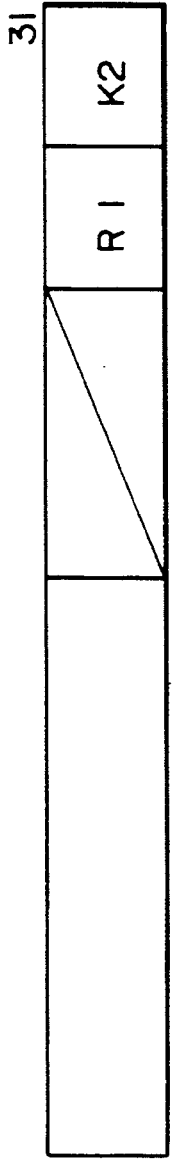
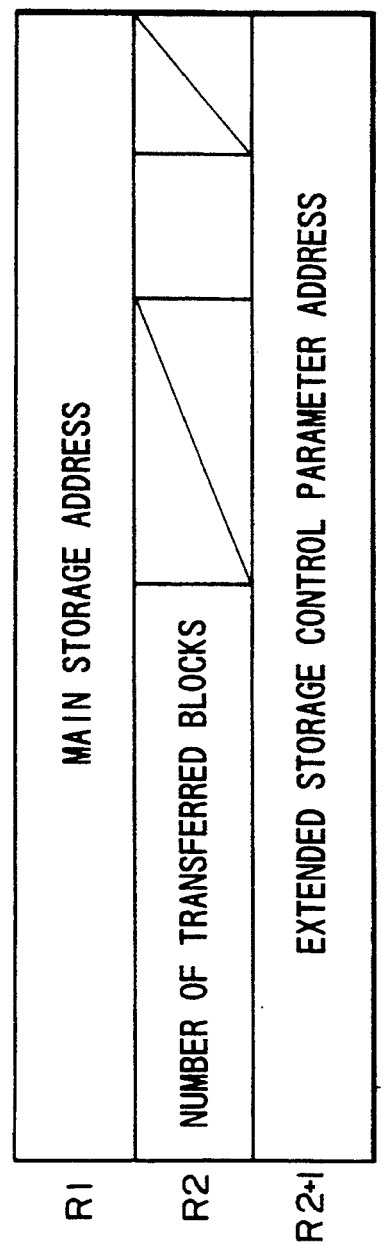
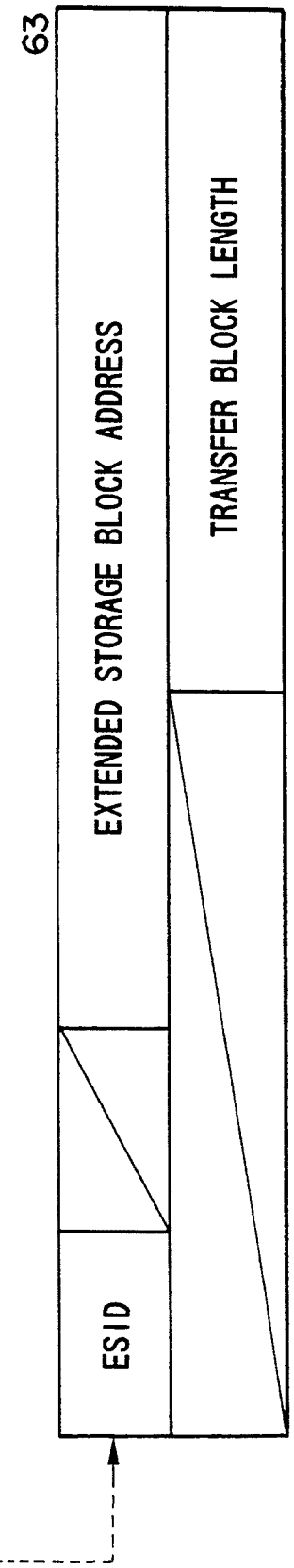
FIG.9A
FIG.9B

PARALLEL PROCESSING SYSTEM AND COMPILING METHOD USED THEREFOR

BACKGROUND OF THE INVENTION

1. Field of the Invention

The present invention relates to a multiprocessor system and a compiling method used for the same.

2. Description of the Related Art

In recent years, with appearance of supercomputers, it has been eagerly demanded to do scientific computations in a large scale and at high speed. For example, the supercomputer, HITAC S-820 developed by HITACHI LTD. includes, in its computer system, extended storage (local extended storage) having a larger capacity than that of main storage, and operating at the same clock in synchronism with the main storage and an instruction processor(s) (see Proc. of IEEE International Conf. on Computer Design, 1984, pp. 227–231).

The extended storage serves as secondary storage for main storage which is a disk device, and permits data delivery for the main storage at much higher speed than the disk device. The extended storage has an address space independent of the main storage. In order to implement the large amount of high speed data transfer between the extended storage and the main storage, the data transfer is done for every 4 KB data. Divided data on the extended storage are read onto the main storage to do calculations on the read data, and the calculation result is written or stored into the extended storage again. Such a procedure is repeated. In this way, a process for dealing with large-scaled data exceeding the storage capacity of the main storage can be performed.

Further, in addition to operating an individual instruction processor at high speed, parallel processing for operating a plurality of instruction processors simultaneously has been generalized. JP-A-1-99141, JP-A-63-305451, JP-A-63-316251, JP-A-204361 and JP-A-55-18720 disclose a structure for performing this parallel processing system, i.e. a system in which plural subsystems each composed of main storage and one or more instruction processors commonly provided for the main storage are prepared and these subsystems are connected by shared extended storage. Further, JP-A-2-77867 (or the corresponding U.S. patent application Ser. No. 07/362286 now abandoned) discloses a system in which local storage devices connected directly between the subsystems are handled as shared storage. These local storage devices are identified by local extended storage device identification numbers (ESIDs) uniquely supplied to these devices.

Two kinds of extended storage used in the above systems can be compared as follows. The data transfer destinations of the former local extended storage are only the main storage or an instruction processor(s). On the other hand, the shared extended storage, which is connected with plural subsystems, needs plural sets of data transfer lines so that the data width on each data transfer line is relatively small. The shared extended storage, which is accessed from plural subsystems, produces access competition from the respective subsystems. Therefore, it is difficult to assure the high data throughput for each subsystem. In order to restrain any access competition at all, in JP-A-63-305451, the shared extended storage is divided into parts corresponding to the number of the subsystems, and when data are stored on the extended storage, they are copied so that data can be read from the respective subsystems simultaneously. Further, the local extended storage, which is located within each subsystem, can operate at the same clock as that for main storage and an instruction processor(s). On the other hand, the shared extended storage operates at the clock independent of each subsystem in order to assure flexibility in the system structure. Thus, a synchronous control circuit is required between the shared extended storage and each subsystem. In JP-A-1-99141, provision of a queue in the synchronous control circuit assures the high data transfer throughput for each subsystem.

JP-A-64-78361 (or the corresponding U.S. patent application Ser. No. 07/209,073 filed on Jun. 20, 1988) discloses a system in which shared storage is provided commonly to plural subsystems although the shared storage is not explicitly described as shared 'extended' storage.

SUMMARY OF THE INVENTION

In order to do large-scaled scientific computations at high speed by a parallel processing system for operating plural instruction processors simultaneously, it is required that not only shared extended storage is used but also local extended storage is secured with each subsystem, and large scale data are allocated to these two kinds of extended storage as necessity requires. Thus, the parallel processing system uses plural kinds of storage including main storage, local extended storage and shared extended storage. Given the system structure, a user must consider of which storage the data should be stored in. It is desired that the two kinds of extended storage which are secondary storage can be dealt with in similar fashion.

In order to solve the above problem, the present invention provides a parallel processing system including plural subsystems each composed of main storage and one or more instruction processors, connected with the main storage, for performing instructions, in which these subsystems are connected by shared extended storage, and each subsystem incorporates local extended storage which is secondary storage for the main storage. Further, a compiler for the above parallel processing system, which includes a source program that uses an extended storage identification number to arrange data on the local extended storage or shared extended storage. The source program, analyzes the definition of the data or the area of a sub-program to be referred to thereby determine whether the data should be allocated on the local extended storage or the shared extended storage.

BRIEF DESCRIPTION OF THE DRAWINGS

FIGS. 9A and 9B are views showing the format of a data transfer instruction between main storage and extended storage in the inventive arrangement;

DESCRIPTION OF THE PREFERRED EMBODIMENT

Figure 1:
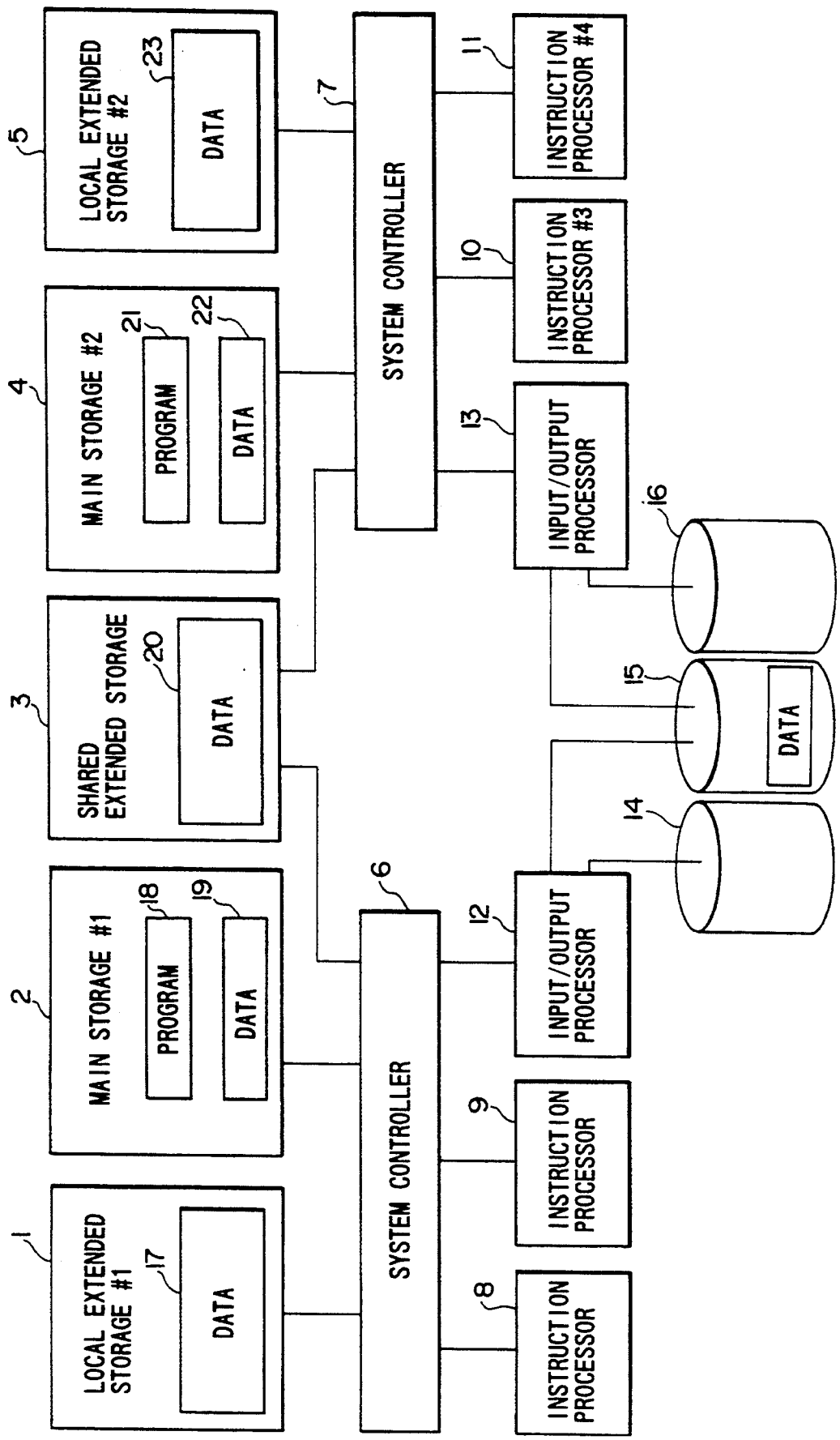
FIG. 1 is a block diagram showing the structure of a parallel processing system in accordance with the inventive arrangement.

FIG. 1 shows the structure of a parallel processing system according to one embodiment of the present invention. In FIG. 1 reference numerals 1 and 5, respectively, denote local extended storages #1 and #2, respectively; 2 and 4, respectively, denote main storages #1 and #2, respectively; 3 denotes a shared extended storage; 6 and 7, respectively, denote system controllers for storages #1 and #2, respectively; 8, 9, 10 and 11, respectively, denote instruction processors #1, #2, #3 and #4, respectively; 12 and 13 denote input/output processors; 14 and 16 denote local DASDs (direct access storage devices); and 15 denotes a shared DASD. Data 20 is stored in shared extended storage 3. Data 17 is stored in local extended storage 1. Program 18 and data 19 are stored in main storage 2. Program 21 and data 22 are stored in main storage 4. Data 23 is stored in local extended storage 5. The instruction processors 8 and 9 share the main storage 2, the local extended storage 1 and the input/output processor 12 through the system controller 6 constitute a first processor subsystem of a tightly coupled structure. Likewise, the instruction processors 10 and 11 share the main storage 4, the local extended storage 5 and the input/output processor 13 through the system controller constitute a second processor subsystem of the tightly coupled structure. These two processor subsystems are connected to the shared extended storage 3 and they constitute a loosely coupled multiprocessor system. It should be noted that the two subsystems and the shared extended storage operate with different clocks and therefore can be operated separately.

In order to distinguish individual extended storage devices from each other, each extended storage device is uniquely numbered and a part of an instruction for accessing the extended storage device includes an identification number (ESID). In this embodiment, two processor subsystems were adopted, but more processor subsystems may be connected with the shared extended storage 3.

FIGS. 9A and 9B show an exemplary instruction for executing data transfer between a main storage and an extended storage devices. FIG. 9A shows a format of the data transfer instruction. An instruction code (OP) indicates that it is for executing the data transfer between the main storage and the extended storage device. Operands (R1) and (R2) designate register numbers. As seen from FIG. 9B, a main storage address is previously prepared in the register (R1) and the number of blocks already transferred during execution of the instruction is held in the register (R2). In a main storage area at the address designated by a register ((R2)+1), is the previously prepared the main storage address in which the extended storage control parameter information is stored. The parameter information includes the identifier number ESID, for distinguishing the individual extended storage devices from each other, a block address on the extended storage and a transfer block length. Each extended storage is addressed with a 4 KB boundary, and therefore accessed in unit of 4 KB data. Each number ESID is statically allotted to an extended storage. Thus, it can be determined, by use of the number ESID, which of the local extended storages and the shared extended storage performs the data transfer with the main storage.

Figure 10:
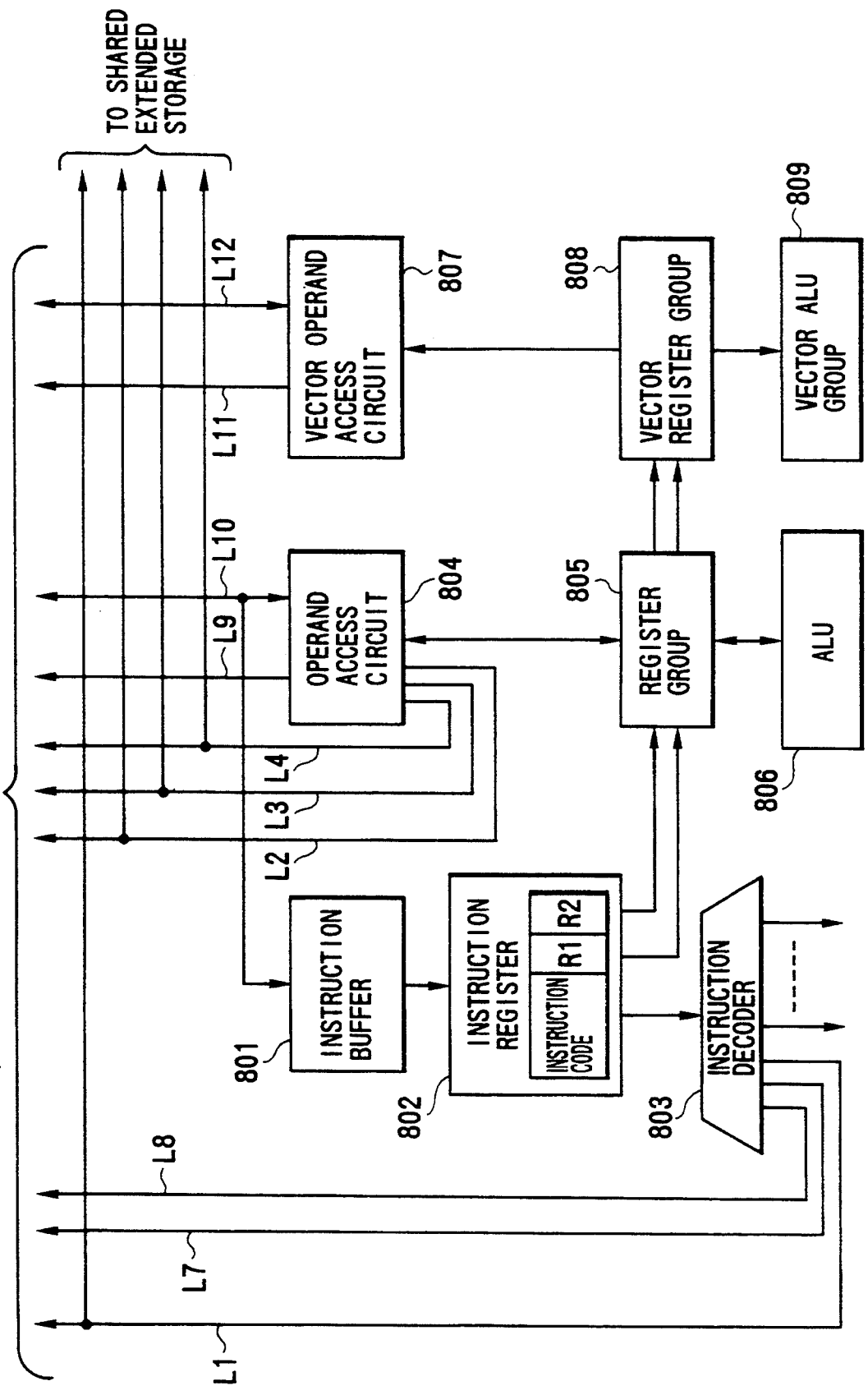
FIG. 10 shows a schematic diagram of an instruction processor in the inventive arrangement.
Figure 11:
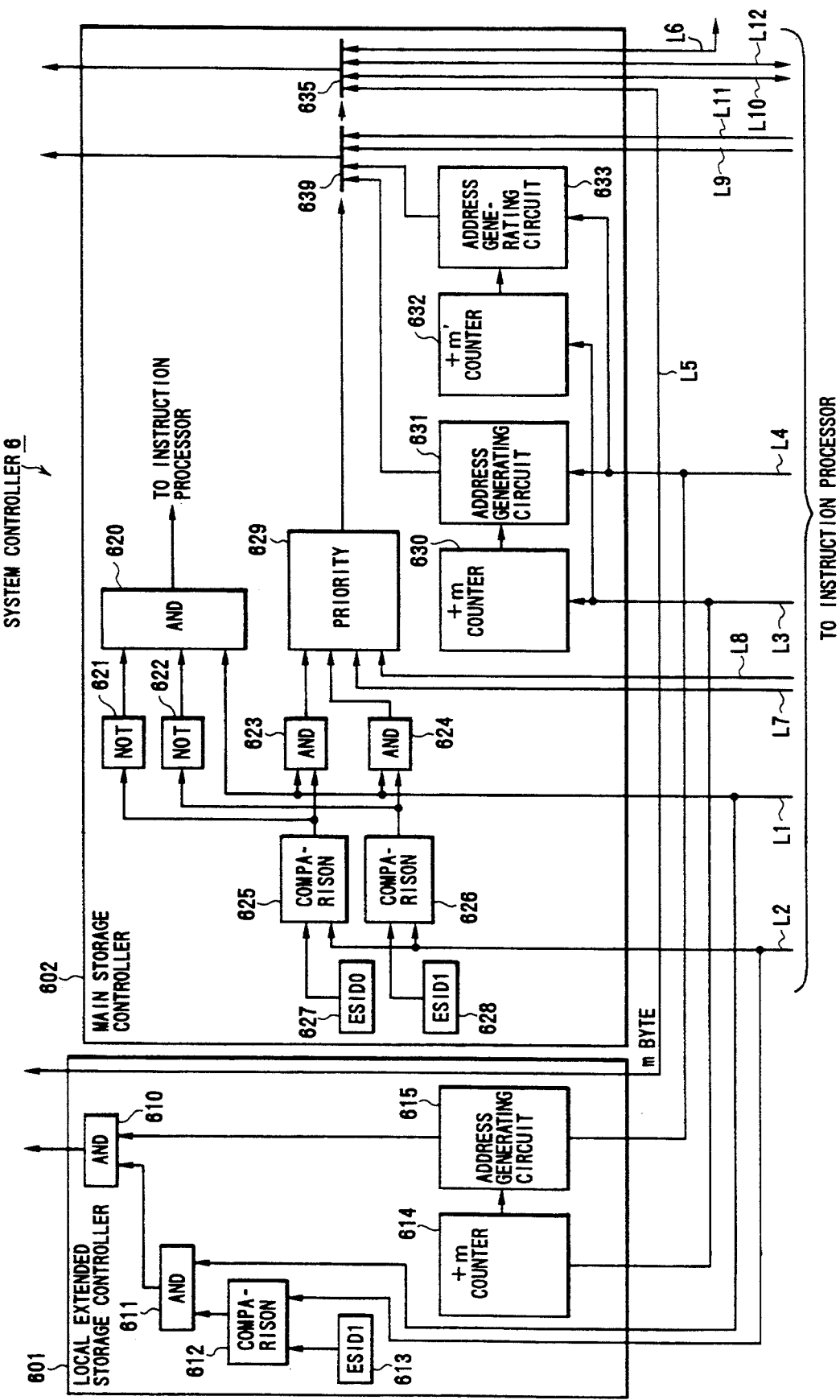
FIG. 11 shows a schematic diagram of a system controller in the inventive arrangement.
Figure 12:
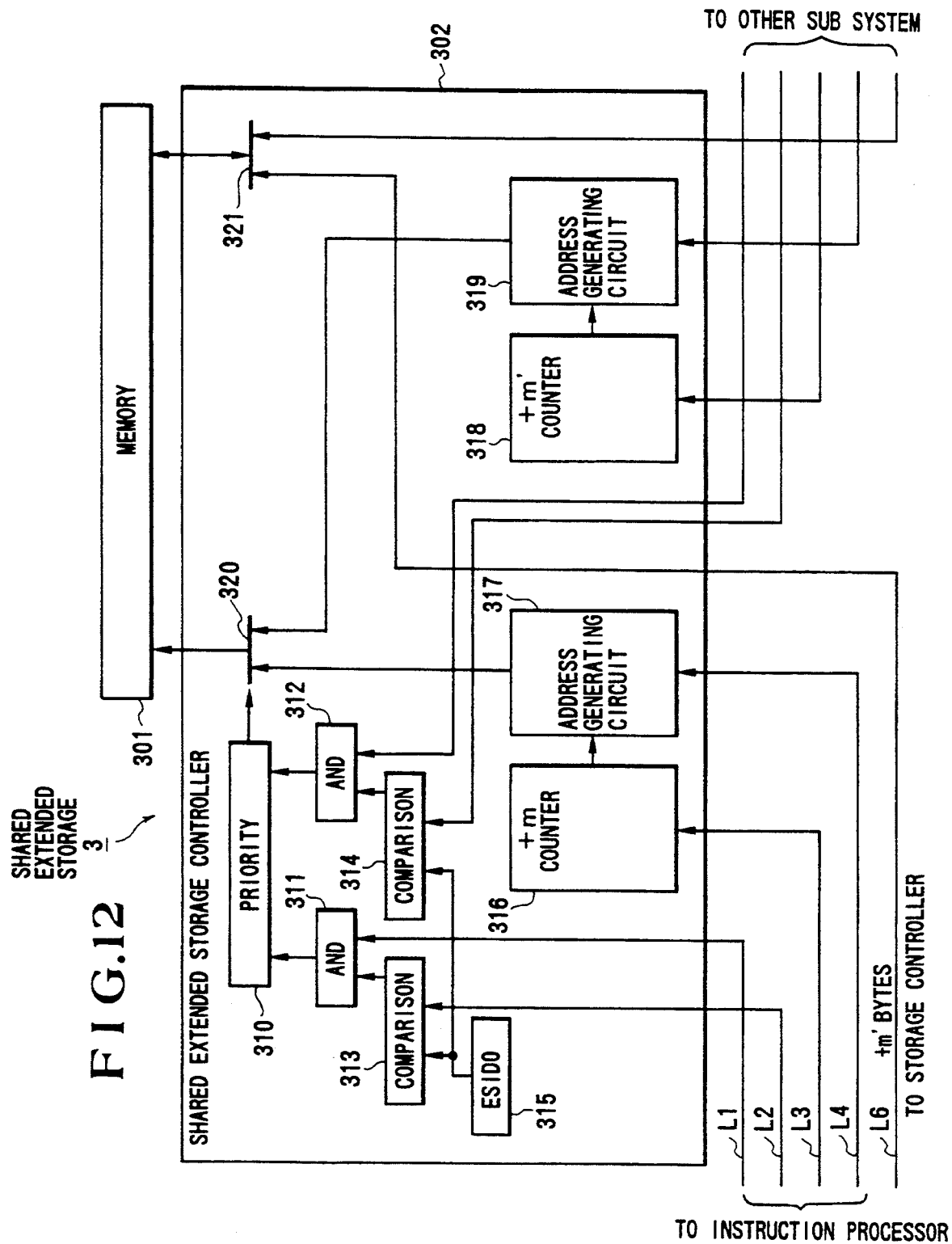
FIG. 12 shows a schematic diagram of a shared extended storage.

With reference to FIGS. 10 to 12, an explanation will be given of the data transfers instructed by the instruction shown in FIG. 9A, between the local extended storage 1 and the main storage 2, between the shared extended storage 3 and the main storage 2, or between the main storage 2 and the instruction processor 8.

FIGS. 10 to 12 show the detailed arrangement of the system controller (#1) 6 and those of the shared extended storage 3 and the instruction processor 8 related to the system controller 6.

In FIG. 10, a reference numeral 801 denotes a instruction buffer; 802 denotes an instruction register; 803 denotes an instruction decoder; 804 denotes an operand access circuit; 805 denotes a group of registers; 806 denotes an ALU; 807 denotes a vector load/store pipe line (a vector operand access circuit); 808 denotes a group of vector registers; and 809 denotes a group of vector ALUs.

In FIG. 11, reference numerals 601 and 602 respectively, denote a local extended storage controller and a main storage controller, respectively; 610 and 611 denotes AND circuits; 612 denotes a comparator; 613 denotes a register for holding an ESID; 614 denotes a +m counter; 615 denotes an address generating circuit; 620, 623 and 624 denote AND circuits; 612 and 622 denote NOT circuits; 625 and 626 denote comparators; 627 and 628 denote registers each for holding an ESID; 629 denotes a priority circuit; 630 denotes a +m counter; 631 denotes an address generating circuit; 632 denotes a +m' counter; 633 denotes an address creation circuit; and 634 and 635 denote selectors.

In FIG. 12, a reference numeral 301 denotes a memory; 302 denotes a shared extended storage controller; 310 denotes a priority circuit; 311 and 312 denote AND circuits; 313 and 314 denote comparators; 315 denotes a register for holding an ESID; 316 and 318 denote +m' counters; 317 and 319 address generating circuits; 320 and 321 selectors.

The local extended storage controller 601 (FIG. 11) and the shared extended storage controller 302 (FIG. 12), respectively, include the registers 613 and 315, respectively, each of which uniquely holds an extended storage device identification number (ESID) upon configuration of a system. The registers 613 and 315 are previously set with ESID#1 and ESID#0, respectively. The main storage controller 602 (FIG. 11) includes the registers 627 and 628, in which the numbers ESIDs of extended storages connected to the system controller 6 (FIG. 11) are previously set upon configuration of the system. The registers 627 and 628, respectively, are previously set with ESID#0 and ESID#1, respectively.

The data transfer between the local extended storage 1 and the main storage 2 is performed in units of successive 4 KB data. The 4 KB data transfer is actually done in units of m (m is an integer of 1 to several tens) bytes through a data transfer path of line L5. Likewise, the data transfer between the shared extended storage 3 and the main storage 2 is also performed in units of successive 4 KB data. The 4 KB data transfer is actually done in units of m' bytes (m' is an integer of 1 to several tens) through a data transfer path of a line L6. The shared extended storage 3 is accessed by plural subsystems, as a result of which it is impossible to provide a wide data path for each subsystem. For this reason, generally, m>m' and thereby, the local extended storage can take a higher throughput than the shared extended storage.

Data access by the instruction processor 8 is performed as follows. Scalar data is obtained by accessing to the main storage 2 through the operand access circuit 804. Vector data is obtained by accessing to the main storage 2 through the vector operand access circuit 807. Specifically, the scalar data is accessed in a unit of 8/4 bytes in accordance with an instruction of a load/store type processed by the instruction processor. The vector data including 1 to several hundreds of elements is accessed in accordance with an instruction of a vector-load/vector-store type.

The data transfer between the extended storage and the main storage will be explained below, taking as an example the data transfer from the local extended storage 1 to the main storage 2, in which the operations of the instruction processor 8, the local extended controller 601 and the main storage controller 602 will be explained in this order.

The instruction processor 8 operates as follows. Referring to FIG. 10, the data transfer instruction shown in FIG. 9 is set in the instruction register 802 through the instruction buffer 801. The instruction code part is decoded by the instruction decoder 803. The decoded data transfer instruction is sent to relevant controllers through line L1, i.e., the main storage controller 602, the local extended storage controller 601 and the shared extended storage controller 302. Based on designations of two register numbers at the operand part of the data transfer instruction stored in the instruction register 802, the group of registers 805 is accessed. A main storage address is designated by the register (R1) and sent to the main storage controller 602 through the operand access circuit 804. In the register ((R2)+1) is held a main storage address in which the extended storage control parameter is stored. Prior to the data transfer processing, the extended storage parameter is fetched from the main storage to be divided into an extended storage identification number (ESID), an extended storage block address and a transfer block length, respectively, which are sent to the main storage controller 602, the local extended storage controller 601 and the shared extended storage controller 302 through lines L2, L3 and L4, respectively.

The local extended storage controller 601 which is a transfer source operates as follows. In FIG. 11, in the local extended storage controller 601, an ESID#1 is previously set in the register 613 upon configuration of a system. The identification number ESID, the extended storage block address and the transfer block length which are information sent from the instruction processor 8 are received by the comparator 612, the address generating circuit 615 and the +m counter 614, respectively. The comparator 612 compares an ESID#1 previously set in the register 613 with the ESID sent from the instruction processor 8. In this example, the coincidence of both is confirmed and the result is sent to the A/D circuit 611. The AND circuit 611 checks whether the instruction from the instruction processor is a write or a read. The address generating circuit 615 sequentially generates addresses for the local extended storage, using as an initial value the extended storage block address sent from the instruction processor 8. These addresses are generated for byte areas every m bytes so that the transfer data are sent to the main storage controller 602 through line of L5 in a unit of m bytes. The +m counter 614 sequentially counts the amount of transferred data. When the data transfer for the transfer block length sent from the instruction processor 8 is completed, the +m counter 614 informs the address generating circuit 615 of this fact so as to stop the address generation. The local extended storage 1 is not accessed from the other subsystem and therefore it does not need control of access conflict.

The main storage controller 602 which is a data transfer destination operates as follows. In the main storage controller 602 are previously set ESIDs of the extended storage devices to be connected thereto upon configuration of the system. In this example, an identification number ESID0 for a shared extended storage is set in the register 627 and an identification number ESID1 for a local extended storage is set in the register 628. The identification number ESID, the block address and the transfer block length which are information sent from the instruction processor 8 are received by the comparators 625 and 626, the address generating circuit 631 and 633 and the +m and +m' counters 630 and 632, respectively. The comparators 612 compare the contents of the registers 627 previously set and 628 with the ESID sent from the instruction processor 8, respectively. In this example, the coincidence of both is confirmed by the comparator 626 and the result is sent to the AND circuit 624, which checks whether the instruction from the instruction processor 8 is a write or a read one. The checking result is sent to the priority circuit 629, which controls conflict between various access requests to the main storage 1. The address generating circuit 631 sequentially generates addresses for the main storage, using as an initial value the main storage address sent from the instruction processor 8. These addresses are generated for byte areas every m bytes so that the transfer data are sent from the local extended storage controller 601 through line of L5 in a unit of m bytes. The +m counter 630 sequentially counts the amount of transferred data. When the data transfer for the transfer block length sent from the instruction processor 8 is completed, the +m counter 630 informs the address generating circuit 631 of this fact so as to stop the address generation. The address generating circuit 633 and the +m' counter 631 perform the same processings as described above, except that the address generation and count-up processings are performed every m' bytes instead of every m bytes; the width of data transferred between the main storage controller 602 and the shared extended controller 302 is also m' bytes. Incidentally, the output from the AND circuit 620 indicates that the extended storage corresponding to the ESID designated by the instruction is not connected to the main storage 2. This result is returned to the instruction processor 8 to end execution of the transfer instruction.

Thus, the data transfer processing from the local extended storage 1 to the main storage 2 is completed.

In comparison to the local extended storage controller 601, the operation of the shared extended storage controller 302 will be explained with reference to FIG. 12. The shared extended storage controller 302 receives access requests from plural subsystems. The operation of the shared extended storage controller 302 for the access request from the instruction processor 8 will be described; it is the same as that for the access request from the other instruction processor.

In the shared extended storage controller 302, an ESID0 is previously set in the register 315 upon the system configuration. The identification number ESID, the block address and the transfer block length which are information sent from the instruction processor 8 are received by the comparator 313, the address generating circuit 317 and the +m' counter 316, respectively. The comparator 313 compares the ESID0 previously set with the ESID sent from the instruction processor 8. The comparison result is sent to the AND circuit 311 which checks whether the instruction from the instruction processor 8 is a write or a read one. The checking result is sent to the priority circuit 310 which controls conflict among various access requests from plural subsystems. The address generating circuit 317 sequentially generates addresses for the shared extended storage, using as an initial value the block address sent from the instruction processor 8. These addresses are generated every m' bytes so that the transfer data are sent to the main storage controller 602 through line of L6 in a unit of m' bytes. The +m' counter 316 sequentially counts the amount of transferred data. When the data transfer for the transfer block length sent from the instruction processor 8 is completed, the +m' counter 318 informs the address generating circuit 317 of this fact so as to stop the address generation. The address generating circuit 319 and the +m' counter 318 perform the same processings as described above for an access request from other subsystems.

As understood from the above description of the data transfer processing from the local extended storage to the main storage and the access processing by the shared extended storage 3, the local extended storage 1 can be accessed at higher speed than the shared extended storage 3. Thus, in a parallel processing system having both the local extended storage 1 and the shared extended storage 3, if the extended storages are effectively used such that the data to be accessed only within a subsystem are stored in the local extended storage 1 whereas the data to be commonly shared to plural subsystems are stored in the shared extended storage 3, large-scaled computations can be realized at high speed.

Meanwhile, in order to do large-scaled scientific computations on the parallel processing system described above, data or programs (object programs) are distributedly located on the storage devices. In the subsystem including the instruction processor 8, the main storage 2 stores object programs and data which are processed by the processor subsystem, the local extended storage 1 stores data which cannot be stored in the main storage and are accessed only within the processor subsystem. This applies to the other processor subsystem. The shared extended storage 3 stores data to be accessed by each of the processor subsystems and is used for data exchange between both the processor subsystems.

Figure 5:
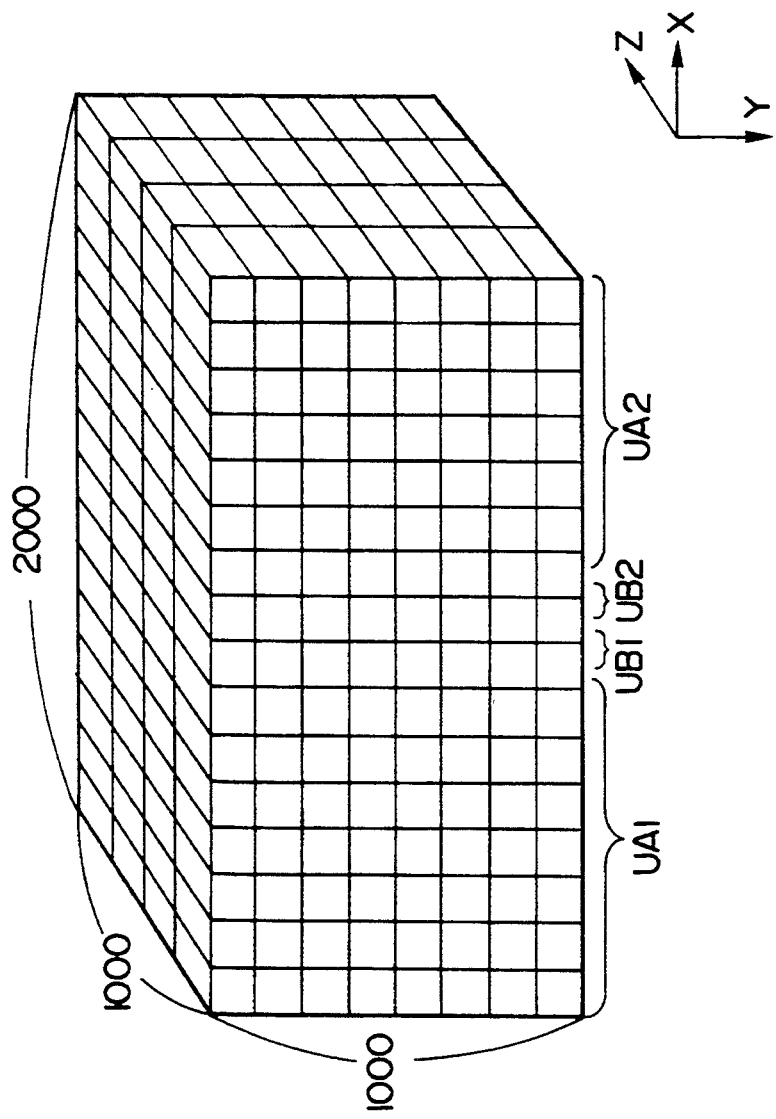
FIG. 5 is a perspective view of an exemplary 3D lattice partition obtained by finite differentiation.

An example of large-scaled scientific computation which can be done on the parallel processing system of the inventive arrangement is heat diffusion. Linear equations obtained by finite differentiation of a three-dimensional (3D) heat diffusion equation (Poisson Equation) can be solved by the R/B SOR (Red/Black Successive Over-Relaxation) method which uses parallel solving methods. This R/B SOR method is described by Murata, Oguni, Miyoshi and Oyanagi in "Kogaku ni okeru Suuchi Simulation (Numerical Simulation in Engineering)"; Tokyo, Maruzen Co. Ltd. , 1988, pp. 308–312. FIG. 5 shows a 3D lattice partition obtained through the finite differentiation. It is assumed that the partition is divided into two parts in a X-direction, and the right half is to be executed by one processor subsystem whereas the left half is to be executed by another processor subsystem. If the numbers of whole lattice points are 2000, 1000, and 1000, respectively in the X-axis, Y-axis and Z-axis direction, respectively, each processor subsystem requires a data region of 8 GB so that it is impossible to store data in only the main storage. For this reason, the data must be allocated to the extended storage device. For computation of each lattice point in the R/B SOR method, information on adjacent lattice is needed points to the lattice. Therefore a part of the data of UB1 and UB2 on the Y-Z plane, which are boundaries in division must be allocated to the shared extended storage. Data regions for this data part are referred to as UB1 and UB2 which are objects for data exchange between the processor subsystems. Since the remaining data parts are accessed within only the corresponding subsystems, they are allocated to their local extended storage devices. Data regions for these data parts are referred to as UA1 and UA2, respectively.

Figure 6:
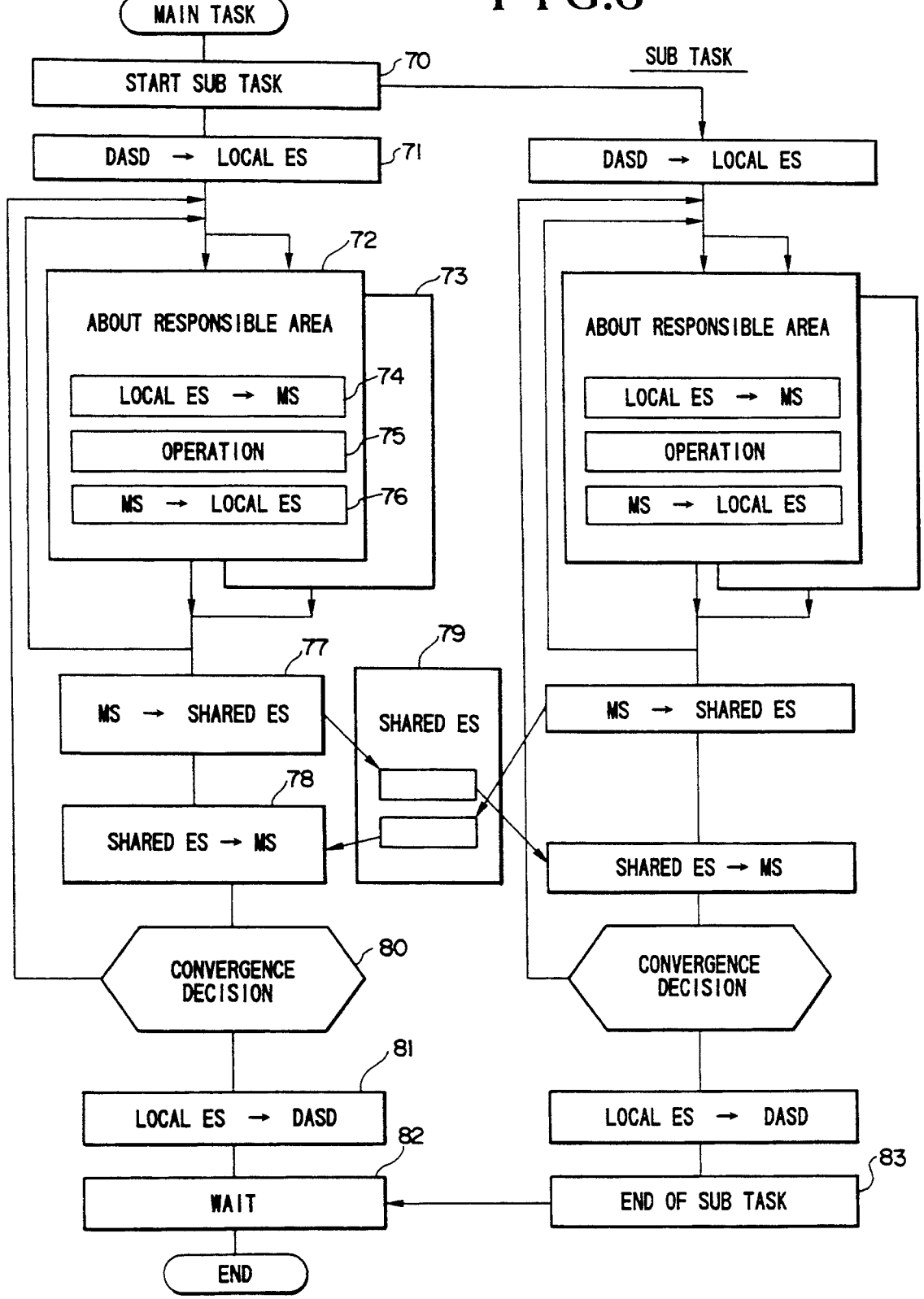
FIG. 6 is a flow chart of a parallel calculation procedure.

FIG. 6 shows the summary of the parallel processing procedure. It is assumed that a main task is executed by one processor subsystem while a sub task is executed by the other processor subsystem. First, the main task initiates the sub task (step 70). Thereafter, the main task and the sub task perform the same or similar processing. A data region is read from the shared DASD 15 (FIG. 1) into the local extended storage (local ES) (step 71). The data region corresponding to an instruction processor is processed by the instruction processor within the processor subsystem. In this case, if there are plural instruction processors within the processor subsystem, the parallel processing sharing the main storage is performed (steps 72 and 73). The following processing is performed by each instruction processor. The data region is read from the local ES into the main storage (MS) in each processor subsystem (step 74). The processing unit (the number of lattice points to be handled for one round of processing) is previously defined in a program based on the capacity of MS and the number of instruction processors in each processor subsystem. The data region is arithmetically processed (step 75). The processing result data are stored from the MS onto the local ES (step 76). Upon completion of arithmetic processing of the data regions for the processor subsystems, exchange of the data is done between the processor subsystems through the shared extended storage (shared ES) (steps 77 and 78). In this example, the data UB1 and UB2 at the boundary (FIG. 5) and information for convergence check (not shown) (which is information enabling each processor subsystem to do a convergence check process, e.g., a partial summation value of the residual norm for each processor subsystem) are exchanged. At this time, in order to assure the order of data access to the shared ES, the Post processing for the shared ES must be done after data have been stored from the MS in the shared ES, and the Wait processing for the shared ES must be done before the data are read out from the shared ES into the MS. Next, the convergence check process is performed (step 80). Until the convergence check condition is satisfied, the processing from the steps 72 to 80 are repeated. When the convergence check condition is satisfied, the resultant data in the local ES are stored in the DASD (step 81). Then, the sub task completes its processing (step 83) and the main task completes the entire processing after the completion of the sub task is confirmed.

An explanation will be given of a method of describing a program for allocating data on extended storage devices.

Figure 7:
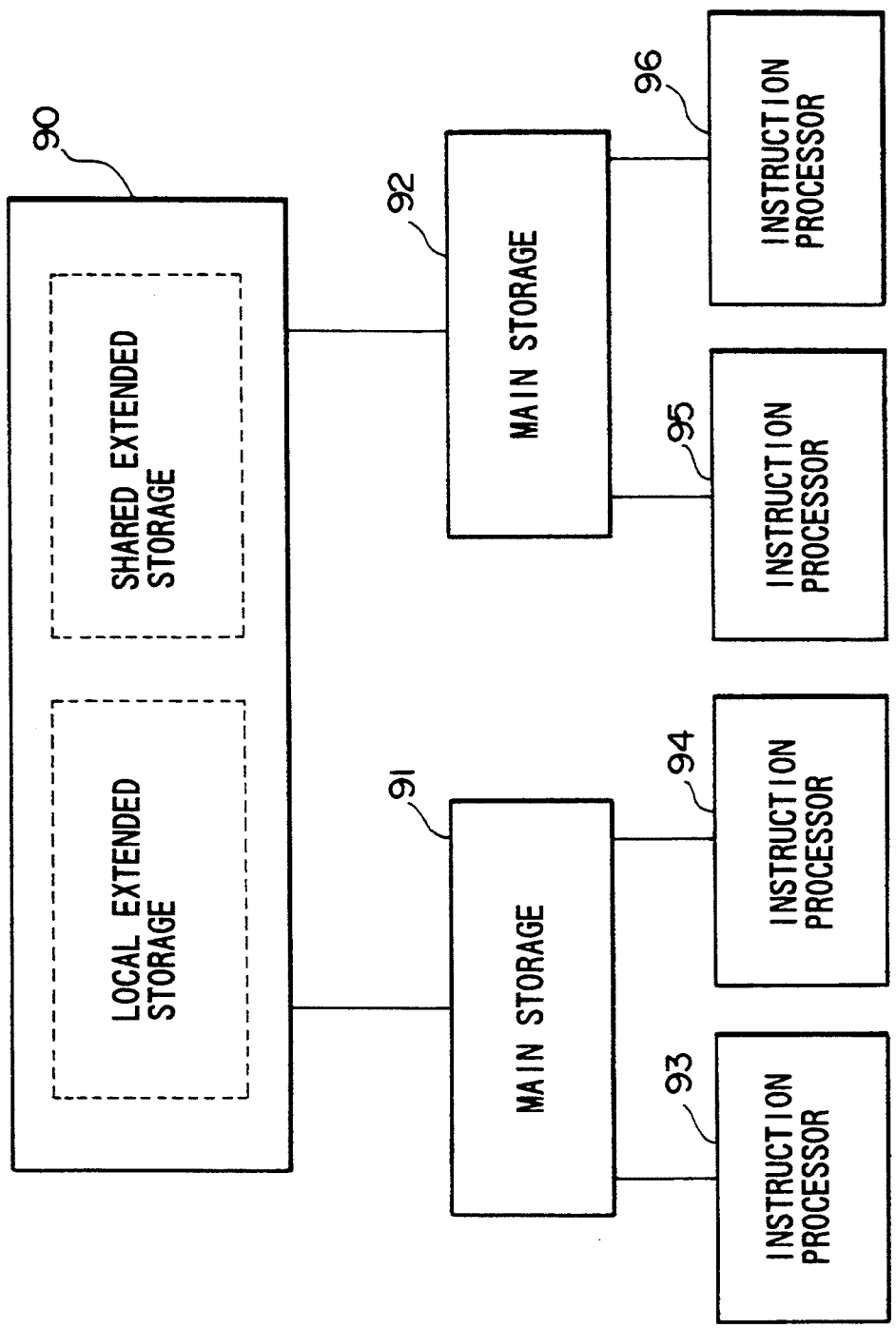
FIG. 7 is a block diagram showing a system structure developed by a source program in the inventive arrangement.

FIG. 7 shows a system configuration viewed from a source program. In FIG. 7, reference numerals 91 and 92 denote main storages (MSs); 90 denotes a shared extended storage (shared ES); and 93 to 96 denote instruction processors. In this example, declarations of data regions on the local ES and shared ES in a source program that are the same is made to a shared storage 90. In order to declare the data regions on the shared storage, an extended COMMON statement (an ECOMMON declaration) obtained by extending the COMMON declaration of the Fortran syntax is defined.

Figure 8:
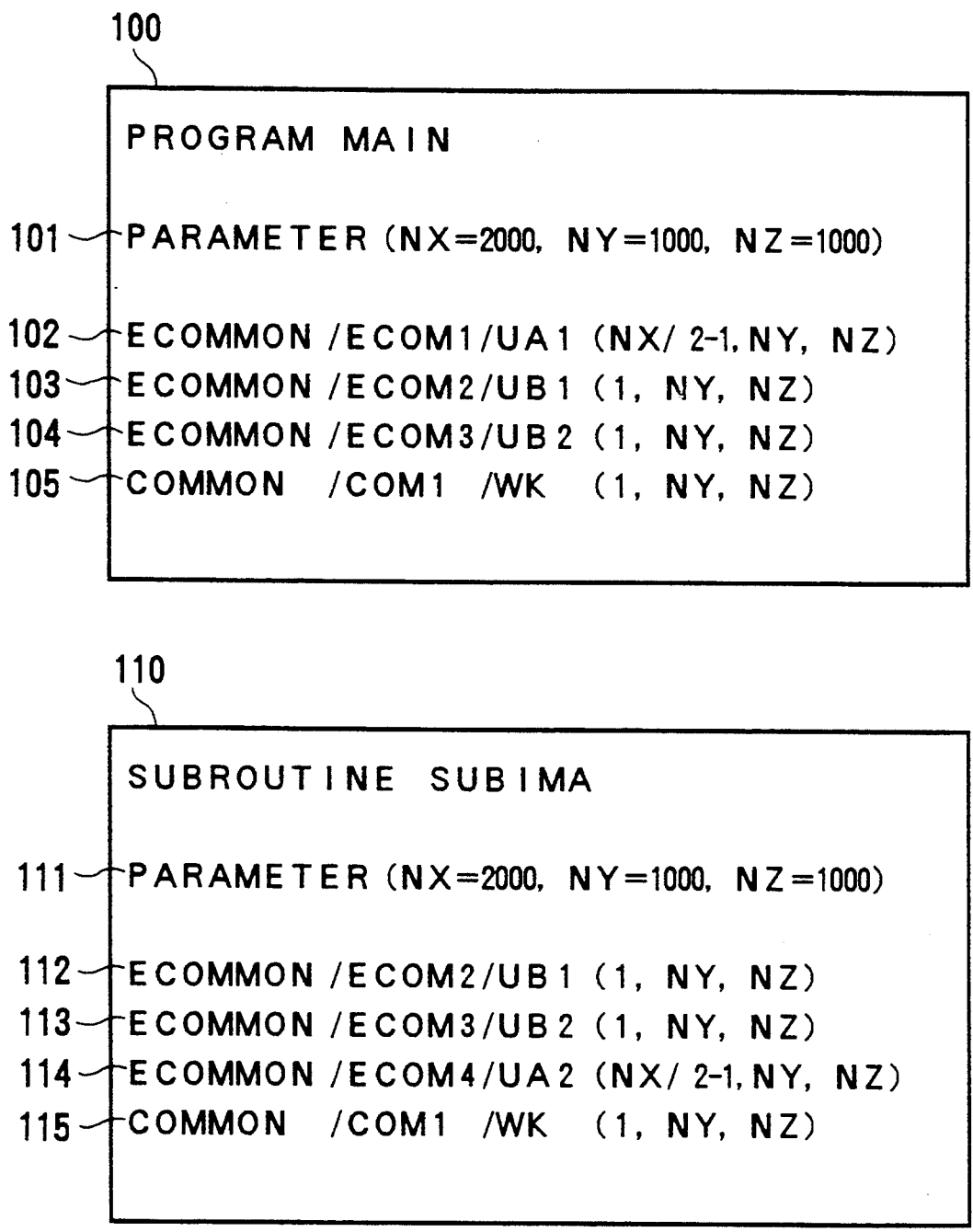
FIG. 8 is a view showing an ECOMMON specification statement in a source program in the inventive arrangement.

FIG. 8 shows exemplary ECOMMON declarations in source programs related to a main task and a sub task, respectively. As seen, ECOMMON statements are declared to allocate data regions of UA1, UB1, UA2 and UB2 (FIG. 5) to the common storage 90- An array WK declared by use of a COMMON statement 105 or 115 is allocated to the main storage and used as a work area when a data region on the common storage 90 are fetched into the main storage.

Figure 2:
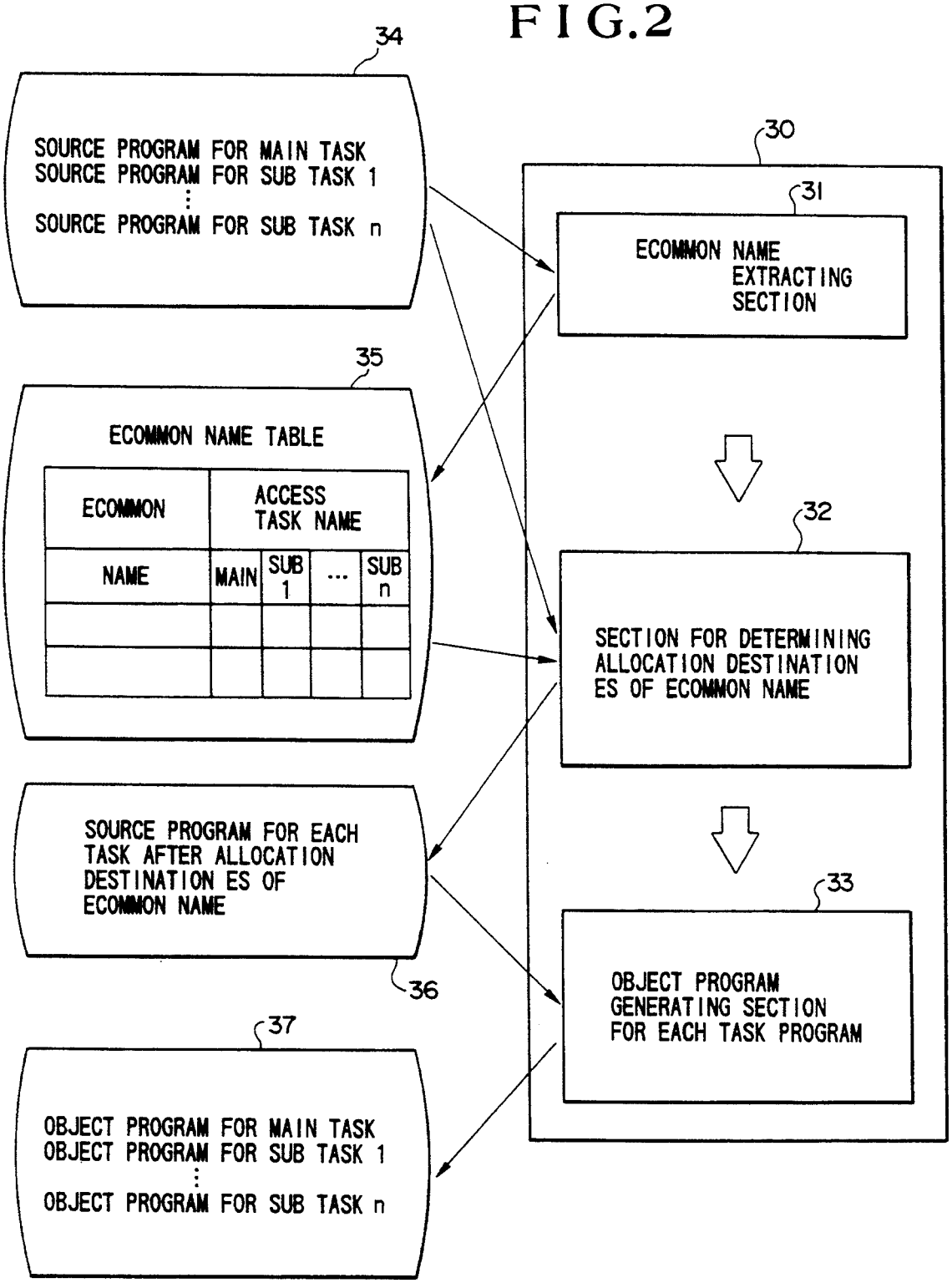
FIG. 2 is a flow chart of a compiler for the embodiment of FIG. 1.
Figure 3:
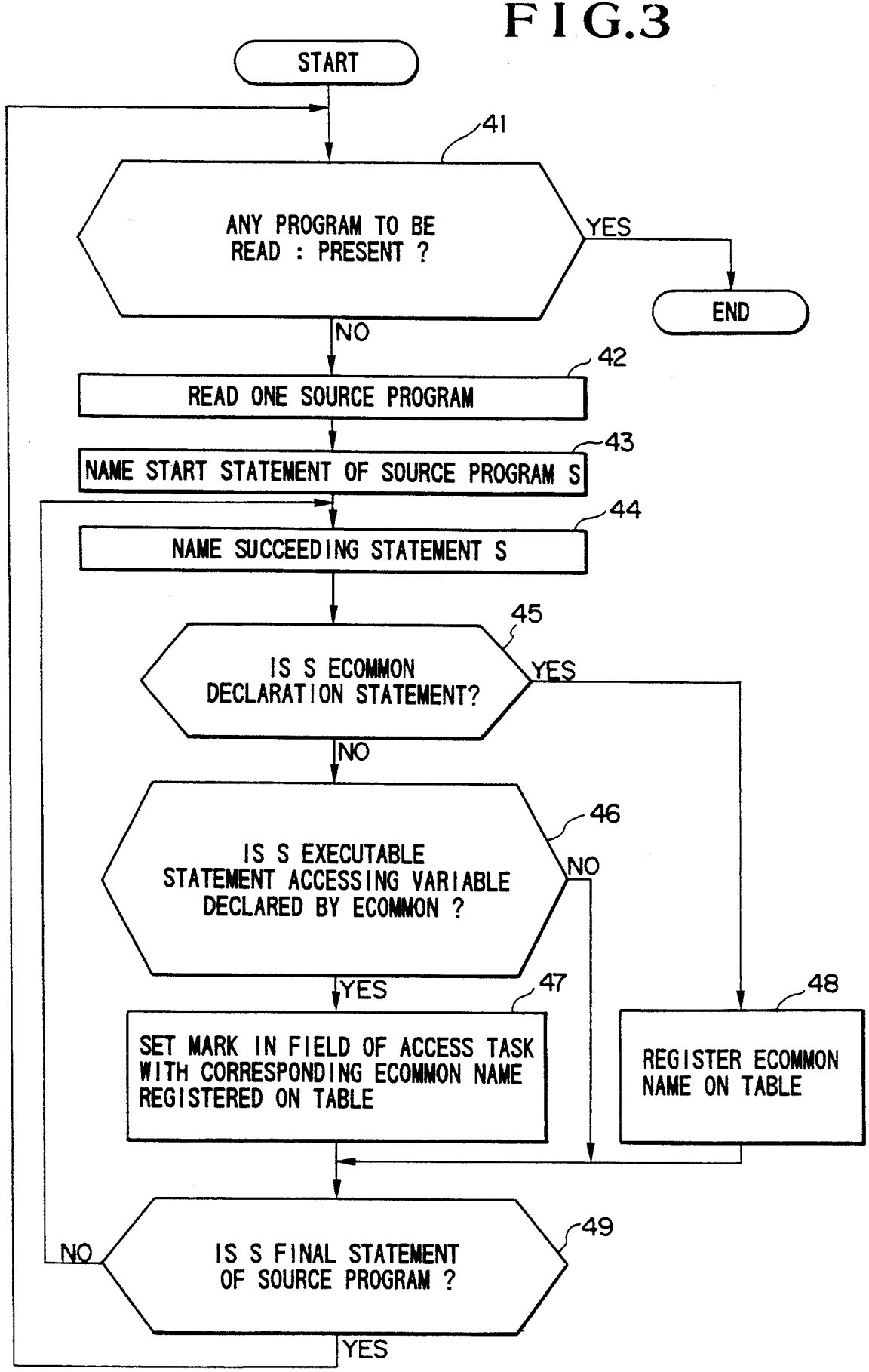
FIG. 3 is a flow chart of extracting an ECOMMON name in the complier of FIG. 2.
Figure 4:
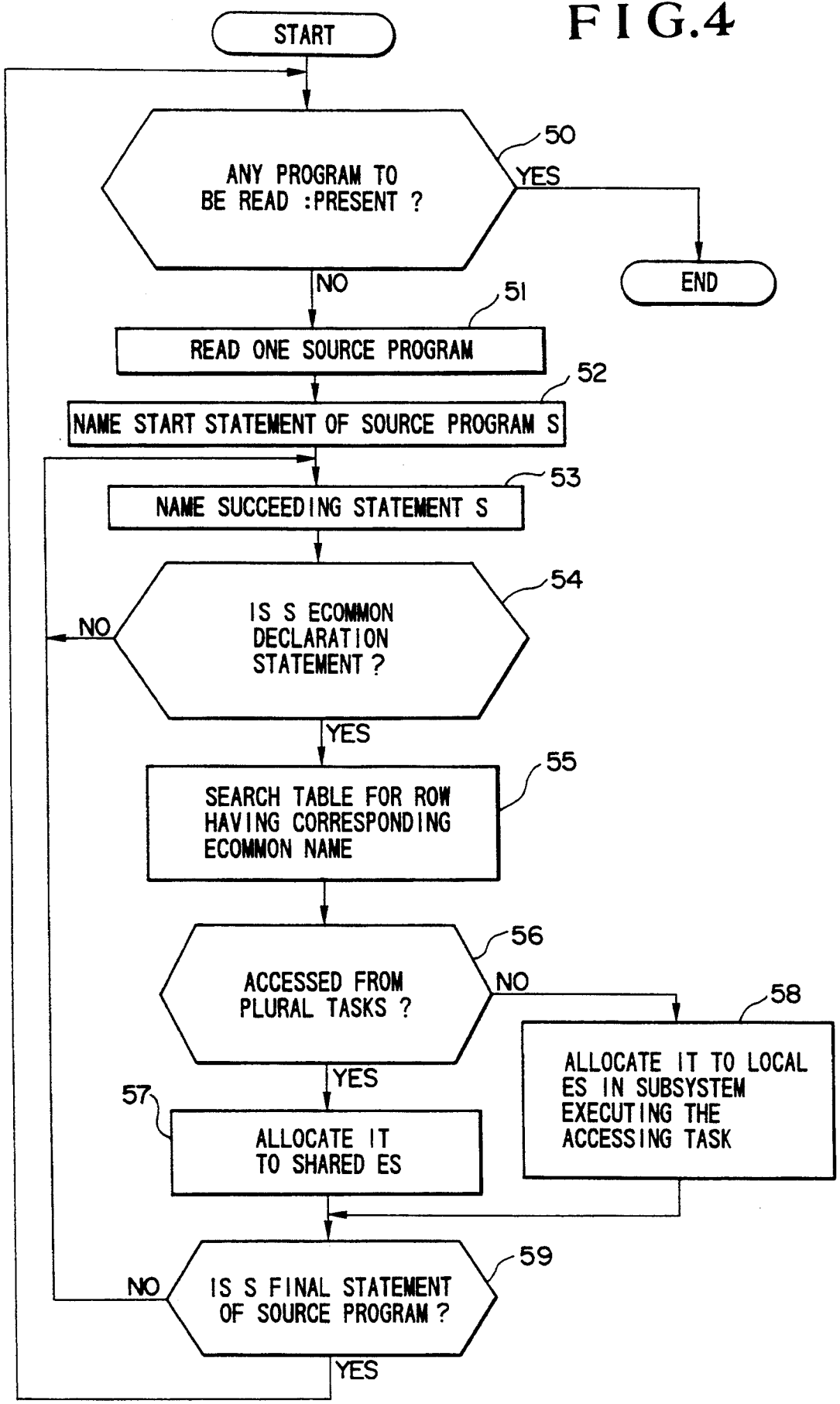
FIG. 4 is a flow chart of determining the allocation destination ES (extended storage) of an ECOMMON name in the complier of FIG. 2.

With reference to FIGS. 2 to 4, an explanation will be given of a method of deciding by a compiler which of the local ES and the shared ES the data declared by the ECOMMON should be stored in. FIG. 2 shows a functional block diagram of the configuration of a compiler according to one embodiment of the present invention. In FIG. 2, reference numeral 30 denotes a compiler; 31 denotes a section for extracting an ECOMMON name; 32 a section for determining an allocation destination ES of the ECOMMON name; 33 denotes an object program generating section; 34 denotes a group of source programs for a main task or sub tasks; 35 denotes an ECOMMON name table; 36 denotes source programs after the allocation destination ES has been determined; and 37 denotes object programs for respective tasks. The compiler 30 serves to receive the source programs 34 for respective tasks and produce the object programs 37 therefor eventually.

In this embodiment, although new functions, i.e., functions of the extracting section 31 and the determining section 32 constitute a part of the compiler, they may be preprocessors which are independent of the compiler and also performed prior to the compiler.

In operation, the extracting unit 31 receives the source programs for the tasks to generate the ECOMMON name table 35 which indicates a task to access a data region allocated to the common storage for each ECOMMON name. The determining section 32 receives the source programs 34 and the ECOMMON name table 35 to produce the source programs 36 after the allocation destination ES has been determined. Finally, the generating section 33 receives the source programs 36 to produce the object programs 37 for the tasks. The generating section 33 is well known as a compiling technique and is not explained here.

Referring to FIG. 3, an explanation will be given of the processing of the ECOMMON name extracting section 31. First, one source program is read from the source programs 34 for the tasks (FIG. 2) (step 42). A statement S in the read source program is analyzed to decide whether or not the statement is an ECOMMON statement sentence (step 43-45). If the statement is the ECOMMON statement sentence, the ECOMMON name is registered in the table 35 (FIG. 2) (step 46). If not, whether or not the statement S is an executable statement of accessing a variable declared by an ECOMMON statement is decided (step 46). If yes, a mark is set in the field of the access task name with the corresponding ECOMMON name registered on the table 35 (step 47). Thus, it is registered that the data in the objective ECOMMON name are to be accessed from the objective task. The above processing is repeated until any source program to be read is not present.

Referring to FIG. 4, an explanation will be given of the processing of the determining section 32 of the allocation destination ES of the ECOMMON name.

First, one source program is read from the source programs 34 for the tasks (FIG. 2) (step 51). An ECOMMON declaration statement is extracted (step 52-54). The ECOMMON name table 35 (FIG. 2) is searched for a row having the corresponding ECOMMON name. If the ECOMMON name is accessed from a plurality of tasks, the ECOMMON is allocated to the shared ES (step 56-57). If the ECOMMON name is accessed from only one task, it is allocated to the local ES in the processor subsystem executing the accessing task (step 58). The above processing is repeated until any source program to be read is not present.

Thus, through the processing in the ECOMMON name extracting section 31 (FIG. 3) and the section 32 of determining the allocation destination ES (FIG. 4) which of the local ES and the shared ES the data declared by the ECOMMON statement should be allocated to can be determined.

According to the present invention, the data defined or referred to only within a processor subsystem are allocated to a local extended storage in the subsystem and therefore large-scaled data can be handled at a relatively high speed. In addition, the data shared among subsystems are allocated to a shared extended storage and hence data exchange among the subsystems can be performed. Further, the descriptions of user programs can be the same for allocation of the data to the local ES or the shared ES. As a result, the program description can be simplified because the user needs not discriminate between the local ES and the shared ES.

What is claimed is:

1. A parallel processing system comprising:
    a plurality of subsystems; and
    a shared extended storage shared by said plurality of subsystems identified by having a shared extended storage (ES) identifier, wherein each of said plurality of subsystems includes:
    a main storage for storing data, instructions and control parameter information;
    a local extended storage identified to a local ES identifier;
    at least one processor for issuing main storage (MS) addresses to said main storage to fetch the instructions from said main storage, executing the fetched instructions, fetching the control parameter information in response to a specific one of the fetched instructions, and issuing a specific MS address, a specific ES address, an ES identifier, a data length and an access request based on the fetched control parameter information; and a system controller for passing the MS addresses from said processor to said main storage and the instructions and the control parameter information from said main storage to said processor, and selectively transferring the data from said main storage to one of said local extended storage or said shared extended storage in response to the access request based on the specific MS address, the specific ES address, the data length and the ES identifier from said processor.

2. A parallel processing system according to claim 1, wherein said system controller includes means for transferring the data from said main storage to said shared extended storage when the ES identifier is the shared ES identifier and to said local extended storage when the ES identifier is the local ES identifier.

3. A parallel processing system according to claim 2, wherein said system controller includes means for performing synchronization control for said shared extended storage when said shared extended storage is accessed.

4. A parallel processing system according to claim 3, wherein an address space of said main storage is allocated to said processor and an address space of the extended storages is not allocated to said processor.

5. A parallel processing system according to claim 3, wherein each subsystem includes a plurality of processors, each subsystem includes a tightly coupled multiprocessor system and said plurality of subsystems are loosely coupled to each other through the system controllers.

6. A program executing method in a parallel processing system comprising a plurality of subsystems and a shared extended storage identified by a shared extended storage (ES) identifier and shared by said plurality of subsystems, each subsystem including a main storage identified by a main storage (MS) identifier, a local extended storage identified by a local ES identifier, at least one processor and a system controller, said method being executed by said each subsystem comprising the steps of:

issuing main storage (MS) addresses to said main storage through said system controller to fetch instructions from said main storage;

executing the fetched instructions;

fetching control parameter information through said system controller in response to a specific one of the fetched instructions;

issuing a specific MS address, a specific extended storage address, a data block address, an ES identifier, a data block length and an access request to said system controller based on the fetched control parameter information; and selectively transferring data blocks from said main storage to one of said local extended storages or said shared extended storage in respond to the access request based on the specific MS address, the specific ES address and the ES identifier from said processor.

7. A program executing method according to claim 6, wherein said selectively transferring step comprises the steps of:

transferring the data blocks from said main storage to said shared extended storage when the ES identifier is the shared ES identifier; and transferring the data blocks from said main storage to said local extended storage when the ES identifier is the local ES identifier.

8. A program executing method according to claim 7, wherein said selectively transferring step comprises the step of:

performing synchronization control for said shared extended storage when said shared extended storage is accessed.

9. A method of compiling a source program for a parallel processing system which comprises a plurality of subsystems and a shared extended storage shared by said plurality of subsystems, each subsystem including a main storage, a local extended storage, at least one processor and a system controller, said method being executed by a computer system comprising the steps of:

extracting a code for specifying data to be stored in the extended storages from the source program;

specifying a plurality of data based on the extracted code;

determining, for each data of said plurality of specified data, how many tasks are accessing said data;

assigning an identifier for the local extended storage to said data accessed by one task such that said data is stored in the local extended storage; and assigning an identifier for the shared extended storage to said data accessed by plural tasks such that said data is stored in the shared extended storage.

* * * * *